United States Patent [19]

Horbach et al.

[11] Patent Number: 4,886,285
[45] Date of Patent: Dec. 12, 1989

[54] TRANSPORTER WITH WHEELS

[75] Inventors: Rainer Horbach, Witten; Hermann Osthoff, Wetter, both of Fed. Rep. of Germany

[73] Assignee: Mannesmann Aktiengesellschaft, Dusseldorf, Fed. Rep. of Germany

[21] Appl. No.: 171,847

[22] Filed: Mar. 22, 1988

[30] Foreign Application Priority Data

Mar. 23, 1987 [DE] Fed. Rep. of Germany ....... 3709530

[51] Int. Cl.4 .................. B60S 9/12; B60G 11/26
[52] U.S. Cl. .................. 280/43.14; 280/43.23; 280/43.24; 280/707; 180/65.5; 180/41; 104/247; 104/257; 105/164; 105/180
[58] Field of Search .............. 280/6.1, 43, 43.13, 280/43.14, 43.17, 43.23, 43.24, 6 H, 6.11, 6.12, 704, 707, 703; 105/136, 164, 180, 199.1, 215.1, 209, 210; 104/249, 252, 257, 247, 245; 180/65.5, 907, 41; 267/64.26.

[56] References Cited

U.S. PATENT DOCUMENTS

| 3,124,368 | 3/1964 | Corley et al. | 280/707 |
| 3,333,551 | 8/1967 | Gross et al. | 105/199.1 X |
| 3,352,254 | 11/1967 | Lauber | 105/180 |
| 3,480,292 | 11/1969 | Börkey | 280/43.17 |
| 3,544,127 | 12/1970 | Dobson | 280/43.17 |
| 3,608,925 | 9/1971 | Murphy | 280/707 |
| 3,734,030 | 5/1973 | Kreissig et al. | 105/164 |
| 3,792,789 | 2/1974 | Oehler | 280/43.23 X |
| 4,113,111 | 9/1978 | Theurer et al. | 105/164 |
| 4,420,167 | 12/1983 | Winblad | 180/41 |
| 4,508,012 | 4/1985 | Reynolds et al. | 280/61. X |
| 4,592,536 | 6/1986 | Jasinski | 104/247 X |

FOREIGN PATENT DOCUMENTS

| 507710 | 11/1954 | Canada | 104/247 |
| 303508 | 12/1932 | Italy | 104/245 |
| 413176 | 3/1946 | Italy | 280/43.24 |
| 140311 | 10/1979 | Japan | 105/215.1 |
| 2123362 | 2/1984 | United Kingdom | 180/65.5 |

Primary Examiner—Charles A. Marmor
Assistant Examiner—Tamara L. Finlay
Attorney, Agent, or Firm—Nils H. Ljungman

[57] ABSTRACT

Underneath a load, on both sides, there are several transporter frames with transporter blocks for wheels. The wheels travel on tracks or rails, on which they are guided with wheel flanges or guide rollers. Each transporter frame has a vertical, U-shaped transporter frame foot, with a pivot shaft for the transporter block, which on the side opposite the pivot shaft has a support plate for the rounded head of a piston of a hydraulic cylinder. Each hydraulic cylinder is supported with its rounded head in a support bearing under the transporter frame. All the hydraulic cylinders of a series are connected by a connecting line and a check valve with a pump.

11 Claims, 2 Drawing Sheets

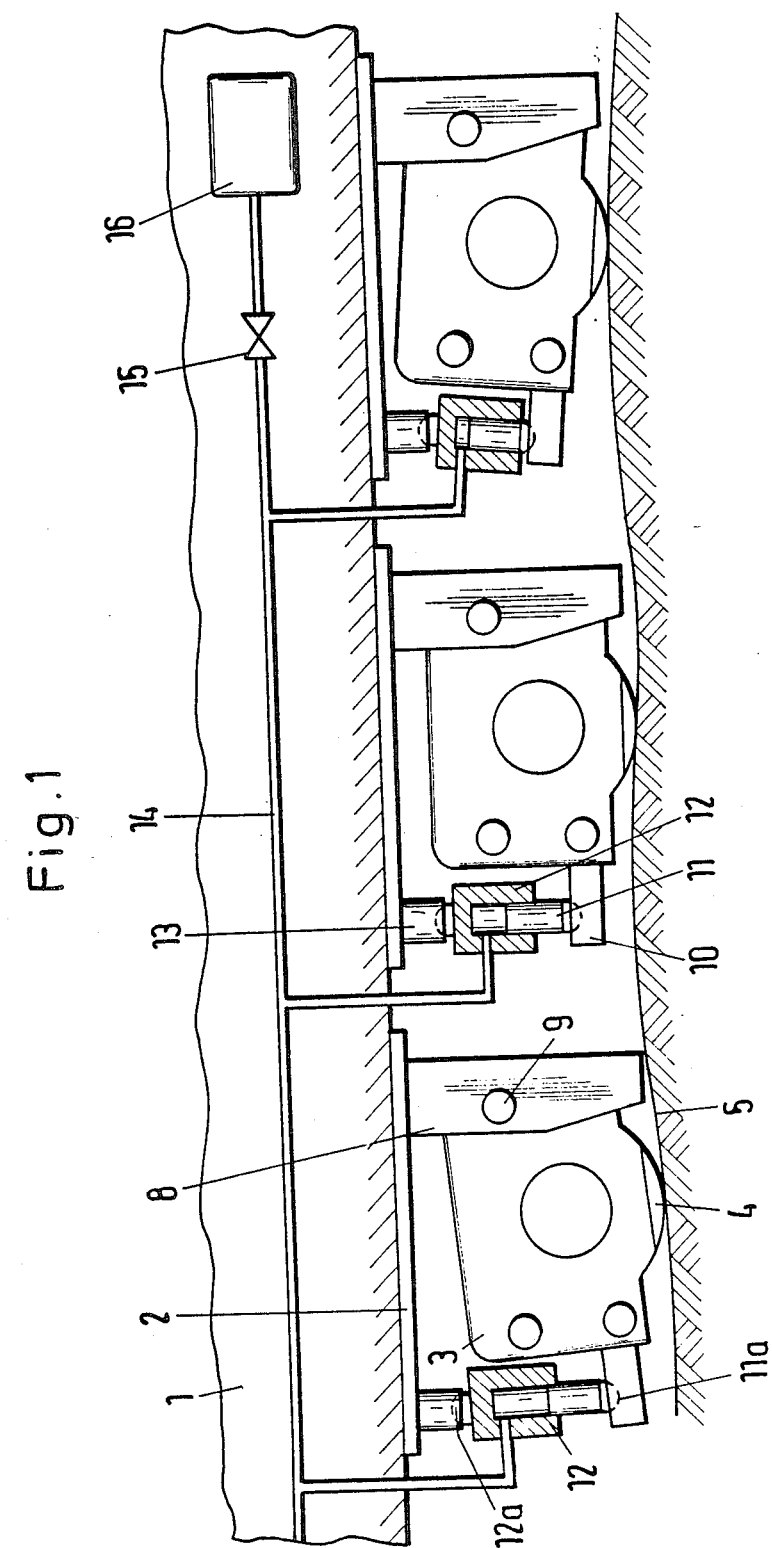

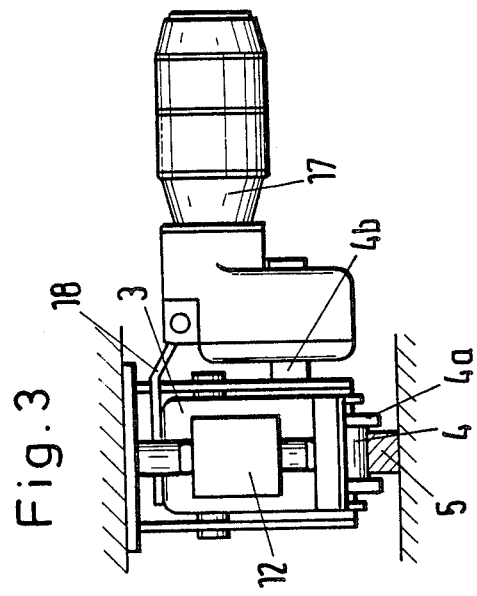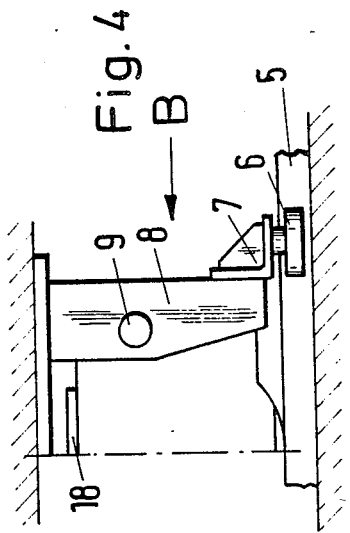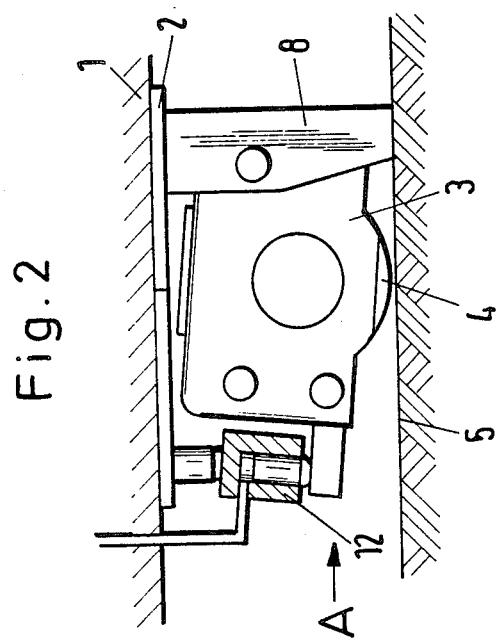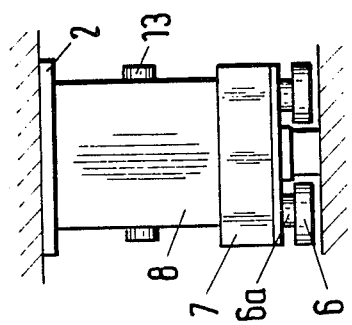

TRANSPORTER WITH WHEELS

BACKGROUND OF THE INVENTION

1. Field of the Invention

This invention relates to transporters with wheels for intra-plant track transport of loads.

2. Description of the Prior Art

The intra-plant transport of heavy loads, e.g., machines etc., has so far been done by means which are not entirely satisfactory, such as rollers laid down temporarily, or short-term raising and movement by means of levers. Wheels are also available which carry the load quite high, which is unfavorable for many applications.

OBJECT OF THE INVENTION

The object of the invention is therefore a transporter apparatus for intra-plant transport which is easy to operate, economical and low to the ground for intra-plant transport. This object is achieved by an embodiment of the invention which comprises a transporter with wheels for intra-plant transport of loads, wherein underneath the load, there are a number of transporter blocks in a row, one behind the other, with wheels, each of which is mounted on one end so that it can pivot on a transporter frame foot, and is supported on the other end by means of an apparatus consisting of a piston and hydraulic cylinder against the load, whereby all the hydraulic cylinders of a group are connected to one another and to a pump by means of a connecting line.

SUMMARY OF THE INVENTION

Transporter blocks equipped with wheels are commercially available components which are low to the ground. As a result of the mounting in a pendulum bearing and the connecting line for the cylinder-piston units, all the wheels are uniformly loaded, even on uneven ground, so that even with extremely small wheels, no individual overloading occurs. Depending on the load, e.g., machines such as welding machines or other loads, more or fewer transporter blocks are placed in rows on each side of the load. To discharge the static pressure from the pumps, check valves can be placed in the connecting lines ahead of the pumps.

In another configuration of the invention, the transporter frame foot supporting the transporter block is fastened to a transporter frame, which is placed under the load and has a support bearing for the piston-cylinder unit. The transporter block, after the escape of the hydraulic fluid, can pivot high enough that the transporter frame foot rests on the floor or a rail. The cylinder and piston project with hemispherical ends into appropriate seats of the support plates and support bearings, and are therefore protected against tipping.

All or some of the wheels can be equipped with drives which are connected by means of torque arms to the transporter blocks. The transporter blocks can be guided on rails by means of guide rollers.

One aspect of the invention resides broadly in a transporter having wheels, the transporter being for intra-plant transport of loads, the transporter including: a suspension arrangement for supporting a load, the suspension arrangement comprising a plurality of suspension devices; the suspension devices comprising a plurality of individual units each having a wheel for making contact with and for riding at least above floors in and around plants; the suspension devices having a pivot arrangement; the plurality of units each having a first end and a second end, the first and second ends disposed one after the other in a row in a direction of travel of the transporter; the pivot arrangement, of at least one suspension device, being disposed at the first end of its corresponding suspension device for pivoting the pivot arrangement associated wheel at least up and down; and an arrangement for raising and lowering the second end of the suspension device at least with respect to the floor.

Another aspect of the invention resides broadly in a transporter having wheels, the transporter being for intra-plant transport of loads, the transporter including: a frame for supporting a load; a plurality of suspension devices connected to the frame; the suspension devices comprising a plurality of individual units each having a wheel for making contact with and for riding at least above floors in and around plants; the suspension devices having a pivot arrangement; the plurality of units each having a first end and a second end, the first and second ends disposed one after the other in a row in a direction of travel of the transporter; the pivot arrangement, of at least one suspension device, being disposed at the first end of its corresponding suspension device for pivoting the pivot arrangement associated wheel at least up and down; and an arrangement for raising and lowering the second end of the suspension device at least with respect to the floor.

Several embodiments of the invention are illustrated in the accompanying figures and explained in greater detail below.

BRIEF DESCRIPTION OF THE DRAWINGS

FIG. 1 shows several transporters beneath a load;

FIG. 2 snows a transporter with the load supported on the floor;

FIG. 3 is a view in direction A in FIG. 2, but with the wheel pressed down;

FIG. 4 shows a side view of a configuration of guide rollers; and

FIG. 5 shows a view in direction B in FIG. 4.

DESCRIPTION OF THE PREFERRED EMBODIMENTS

On both sides under a load 1, several transporter frames 2 with transporter blocks 3 for wheels 4 are fastened in rows.

The wheels 4 preferably move on tracks or rails 5, on which they are guided by means of wheel flanges 4a or guide rollers 6. The latter are fastened with their vertical shafts 6a and roller mountings 7 on a transporter frame foot 8.

Each transporter frame 2 has a vertical U-shaped transporter frame foot 8 with a pivot shaft 9 for the transporter block 3. The transporter block 3, on the side opposite the pivot axis 9, has a support plate 10 for the rounded head 11a of a piston 11 of a hydraulic cylinder 12. Each hydraulic cylinder 12 is supported with its rounded head 12a in a support bearing 13 under the transporter frame 2. All the hydraulic cylinders in a row are connected by means of a connecting line 14 and a check valve 15 with a pump 16.

If there are uneven spots in the track, the connecting line 14 compensates for the level differences, as shown by the different positions of the pistons 11 in their cylinders 12 in FIG. 1. The transporter frame foot 8 extends downward far enough so that when the transporter block 3 pivots, taking full advantage of the piston stroke in the hydraulic cylinder 12, the frame foot 8 comes into contact with the track 5, and the load is removed from the wheel 4 of the transporter block 3, as shown in FIG. 2. As a result of a pressure decrease in the connecting line 14, after the opening of the check valve 15, the transporter frame feet 8, of all the transporter blocks 3, come into contact with the track or the rail 5, and absorb the load. The movable load, a machine etc., then stands securely when the hydraulic mechanism is depressurized. To move the load again, the pump 16 transports the pressure medium through the open check valve 15 and the connecting line 14 into the hydraulic cylinder 12, and the pistons 11 are moved downward and press the wheels 4 against the track, and the transporter blocks 3 lift the load 1. The check valve 15 is then closed, and the pump 16 is depressurized. If the loads in individual areas are very different, there is a connecting line 14 with check valve 15 and pump 16 for each area.

The axles 4b of the wheels 4 can be connected to drives 17, which are supported on the transporter blocks 3 by means of torque arms 18, as shown in FIG. 3.

In summing up, the present invention relates to a transporter with wheels for intra-plant transport of loads, wherein underneath the load 1 there are a number of transporter blocks 3 in a row, one behind the other, with wheels 4, each of which is mounted on one end so that it can pivot on a transporter frame foot 8, and is supported on the other end by means of an apparatus comprising a piston 11 and hydraulic cylinder 12 against the load 1, whereby all the hydraulic cylinders 12 of a group are connected to one another and to a pump 16 by means of a connecting line 14.

Another aspect of the invention relates to a transporter wherein there is a check valve 15 in the connecting line 14 between the pump 16 and the hydraulic cylinders 12.

Yet another aspect of the invention relates to a transporter wherein the transporter frame foot 8 is fastened to a transporter frame 2 fastened underneath the load 1, the transporter frame 2 having, on the end opposite the transporter frame foot, a support bearing 13 for the cylinder-piston apparatus, for which the transporter block 3 is equipped with a support plate 10.

Yet an additional aspect of the invention relates to the support plate 10 and support bearing 13 have seats for the rounded heads 11a, 12a of pistons 11 and hydraulic cylinders 12.

Yet a further aspect of the invention relates to a transporter wherein the transporter frame foot 8 extends to near the track 5, and can come into contact with the latter.

Still yet a further aspect of the invention relates to a transporter wherein the axles 4b of the wheels 4 are connected with drives 17, which are supported by means of torque arms 18 on the transporter blocks 3.

Still a further aspect of the invention relates to a transporter wherein horizontal forces resulting from the guidance of the wheels 4 on a rail 5 can be reduced by guide rollers 6 on the foot of the transporter frame 2. These guide rollers 6 are preferably disposed on either side of the rail 5.

Recapitulating the embodiments of the invention, some aspects of which are the following:

A transporter having wheels wherein a plurality of suspension devices comprises a plurality of transporter block arrangements disposed in at least one row, the block arrangement of each row being disposed one behind the other: each of the wheels being mounted away from the first end of its associated block arrangement; and the raising and lowering arrangement comprising, in association with each block, a hydraulic cylinder arrangement with a piston disposed therein for raising and lowering the transporter.

In another aspect, the transporter includes a hydraulic supply arrangement connected to the hydraulic cylinders.

In yet another aspect, the transporter includes an arrangement for adjusting the hydraulic pressure of at least each row of the block arrangement, the hydraulic pressure adjusting arrangement comprising a source of hydraulic pressure.

In still yet another aspect, the hydraulic supply arrangement has a pump and connecting line arrangement, and the hydraulic pressure adjusting arrangement comprises a check valve in the connecting line arrangement between the pump and the hydraulic cylinders.

In another aspect of the invention, the transporter block has a foot arrangement disposed at the first end, the foot arrangement extending downwardly a substantial distance toward the floor in a raised load position of the suspension device and the foot arrangement being for contacting, in a lowered load position of the suspension device, with a member chosen from the group consisting essentially of: a floor and a rail disposed on a floor.

In yet another aspect of the invention, the transporter has a frame and the pivot arrangement has a transporter block; the transporter block has a foot disposed at the first end of the pivot arrangement; the foot having a support bearing for supporting its corresponding wheel; the hydraulic cylinder arrangement having a pivotable shaft at the second end of the pivot arrangement of each pivot arrangement, and connecting the foot support bearing and the hydraulic arrangement, a support plate being disposed at the at least one second end of the pivot arrangement, the support plate making contact with and holding the hydraulic cylinder on the connecting arrangement; a support member being disposed to make contact with an end of the hydraulic arrangement opposite the support plate.

In still yet another aspect of the invention, the support member is for making contact with its corresponding hydraulic cylinder arrangement, the support bearing and the support plate having seats with rounded portions for making contact with corresponding rounded and mating portions of its corresponding piston shank of its hydraulic cylinder end with corresponding rounded and mating portions of the hydraulic cylinder opposite the piston shank.

In still yet another aspect of the invention, the includes a motive arrangement for moving the transporter, the transporter having a block attached thereto, the wheel having axles disposed through the block and being connected to the motive arrangement; and further including at least one torque arm connected to its corresponding motive arrangement, the at least one torque arm also being connected to its corresponding block.

A further aspect of the invention resides in the transporter being a rail mounted transporter, and including a guidance arrangement for being disposed adjacent the rails, the guidance arrangement being disposed at a bottom portion of the transporter.

Still yet a further aspect of the invention resides in the transporter having a frame and the transported block having a foot arrangement disposed at the first end, the foot arrangement being fastened to the transporter frame, the foot arrangement having a support bearing for supporting its corresponding pivot arrangement with its corresponding wheel.

The invention as described hereinabove in the context of the preferred embodiments is not to be taken as limited to all of the provided details thereof, since modifications and variations thereof may be made without departing from the spirit and scope of the invention.

What is claimed is:

1. A transporter having wheels, said transporter being for intra-plant transport of loads, said transporter comprising:
   a suspension arrangement for supporting a load, said suspension arrangement comprising a plurality of:
   individual units each having a wheel for making contact with and for riding at least above floors in and around plants;
   said individual units each having a pivot arrangement;
   said plurality of units each having a first end and a second end, said first and second ends disposed one after the other in a row in a direction of travel of said transporter;
   the pivot arrangements, being disposed at the first end of their corresponding individual units, for pivoting their associated wheels at least up and down;
   the wheels being disposed in at least two rows, one on each side of the transporter, the wheels of each row being disposed one behind the other;
   each of the wheels being mounted on a pivotable mount for being pivoted about its corresponding pivot arrangement;
   each of the wheels being disposed on its corresponding mount away from its associated pivot arrangement;
   hydraulic cylinders with pistons disposed therein for raising and lowering the transporter by pivoting each said wheel on its corresponding mount about its corresponding pivot arrangement; and
   a hydraulic supply arrangement connected to the hydraulic cylinders;
   said hydraulic supply arrangement comprising:
   a hydraulic line directly connecting the hydraulic cylinders of the wheels arranged in a row on one side of said transporter to permit flow of hydraulic fluid between said hydraulic cylinders of that one row of the wheels arranged in a row on one side of said transporter to compensate for level differences of the floors; and
   wherein each said individual unit has a foot disposed at said first end, said foot extending downwardly a substantial distance toward the floor in a raised load position of said transporter and said foot being for contacting, in a lowered load position of said transporter, with a member chosen from the group consisting essentially of: a floor and a rail disposed on a floor.

2. The transporter according to claim 1, wherein said hydraulic supply arrangement includes means for adjusting the hydraulic pressure of at least each said row of individual units.

3. The transporter according to claim 2, including a check valve connected between said pressure adjusting means and the directly connecting hydraulic line.

4. The transporter according to claim 3, wherein said transporter has a frame;
   said foot connected to the frame being disposed at said pivoting arrangement;
   each said pivotable mount extending between its corresponding pivot arrangement and its corresponding hydraulic cylinder; and
   a support plate disposed on said frame and also being disposed to make contact with an end of its corresponding hydraulic cylinder opposite said pivotable mount.

5. The transporter according to claim 2, wherein said transporter has a frame;
   said foot connected to the frame being disposed at said pivoting arrangement;
   each said pivotable mount extending between its corresponding pivot arrangement and its corresponding hydraulic cylinder; and
   a support plate disposed on said frame and also being disposed to make contact with an end of its corresponding hydraulic cylinder opposite said pivotable mount.

6. The transporter according to claim 2, including motive means for moving said transporter, said transporter having a block attached thereto, said wheels having axles disposed through said block and being connected to said motive means; and further including at least one torque arm connected to its corresponding motive means, said at least one torque arm also being connected to its corresponding individual unit.

7. The transporter according to claim 1, wherein said transporter has a frame;
   said foot connected to the frame being disposed at said pivoting arrangement;
   each said pivotable mount extending between its corresponding pivot arrangement and its corresponding hydraulic cylinder; and
   a support plate disposed on said frame and also being disposed to make contact with an end of its corresponding hydraulic cylinder opposite said pivotable mount.

8. The transporter according to claim 1, including motive means for moving said transporter, said transporter having a block attached thereto, said wheels having axles disposed through said block and being connected to said motive means; and further including at least one torque arm connected to its corresponding motive means, said at least one torque arm also being connected to its corresponding individual unit.

9. The transporter according to claim 7, wherein said transporter is a rail mounted transporter, and including guidance means for being disposed adjacent the rails, said guidance means being disposed at a bottom portion of the transporter.

10. The transporter according to claim 1, including motive means for moving said transporter, said transporter having a block attached thereto, said wheels having axles disposed through said block and being connected to said motive means; and further including at least one torque arm connected to its corresponding motive means, said at least one torque arm also being connected to its corresponding individual unit.

11. The transporter according to claim 1, wherein said transporter is a rail mounted transporter, and including guidance means for being disposed adjacent the rails, said guidance means being disposed at a bottom portion of the transporter.

* * * * *